(12) United States Patent
Lee

(10) Patent No.: US 7,453,064 B2
(45) Date of Patent: Nov. 18, 2008

(54) DUAL-BAND REFLECTIVE INFRARED THERMAL IMAGING SYSTEM

(75) Inventor: Tzong-Sheng Lee, Miaoli Hsien (TW)

(73) Assignee: Unimems Manufacturing Co., Ltd., Hsinchu (TW)

( * ) Notice: Subject to any disclaimer, the term of this patent is extended or adjusted under 35 U.S.C. 154(b) by 165 days.

(21) Appl. No.: 11/260,400

(22) Filed: Oct. 28, 2005

(65) Prior Publication Data

US 2006/0261271 A1 Nov. 23, 2006

(30) Foreign Application Priority Data

May 17, 2005 (TW) .............................. 94115961 A

(51) Int. Cl.
*H01L 31/02* (2006.01)
(52) U.S. Cl. ...................... 250/330; 250/353
(58) Field of Classification Search ................ 250/330, 250/353
See application file for complete search history.

(56) References Cited

U.S. PATENT DOCUMENTS

| | | | | |
|---|---|---|---|---|
| 4,709,153 A | * | 11/1987 | Schofield | 250/353 |
| 5,264,916 A | * | 11/1993 | Bushman | 356/364 |
| 5,784,105 A | * | 7/1998 | Kawamura | 348/372 |
| 6,593,561 B2 | * | 7/2003 | Bacarella et al. | 250/208.1 |
| 6,970,190 B2 | * | 11/2005 | Ostromek et al. | 348/217.1 |
| 7,092,013 B2 | * | 8/2006 | Bacarella et al. | 348/217.1 |
| 7,129,462 B2 | * | 10/2006 | Hogan et al. | 250/214 VT |
| 2002/0195561 A1 | * | 12/2002 | Bacarella et al. | 250/330 |
| 2003/0230707 A1 | * | 12/2003 | Hogan et al. | 250/214 VT |
| 2003/0231245 A1 | * | 12/2003 | Bacarella et al. | 348/217.1 |
| 2003/0231804 A1 | * | 12/2003 | Bacarella et al. | 382/284 |
| 2003/0234870 A1 | * | 12/2003 | Ostromek et al. | 348/217.1 |

* cited by examiner

*Primary Examiner*—David P Porta
*Assistant Examiner*—David S Baker
(74) *Attorney, Agent, or Firm*—Rosenberg, Klein & Lee

(57) ABSTRACT

A dual-band reflective infrared thermal imaging system is described. The dual-band reflective infrared thermal imaging system includes a reflective infrared thermal imager and a refractive visible light video camera. The refractive visible light video camera is configured at the central axis of the reflective infrared thermal imager so that the refractive visible light video camera and the reflective infrared thermal imager can synchronously and coaxially capture the images. The reflective infrared thermal imager further includes a reflective optical module and an infrared imaging sensor. The infrared images are focused on the infrared imaging sensor by way of the reflective optical module.

12 Claims, 1 Drawing Sheet

DUAL-BAND REFLECTIVE INFRARED THERMAL IMAGING SYSTEM

RELATED APPLICATIONS

The present application is based on, and claims priority from, Taiwan Application Serial Number 94115961, filed May 17, 2005, the disclosure of which is hereby incorporated by reference herein in its entirety.

FIELD OF THE INVENTION

The present invention generally relates to a reflective infrared thermal imaging system. More particularly, the present invention relates to a small form factor dual-band reflective infrared thermal imaging system.

BACKGROUND OF THE INVENTION

Due to rapid progress in the semiconductor industry and electronic technologies, technologies for manufacturing infrared measuring sensors have also progressed significantly. Infrared measuring sensors not only apply to the medical purpose of measuring body temperature but also apply to scientific, commercial and military purposes, such as laser detection, missile guidance, infrared spectrometry, remote control, burglarproofing equipment and thermal image detection. Conventionally, infrared measuring sensors include thermal type infrared measuring sensors and photon type infrared measuring sensors. Since the thermal type infrared measuring sensor is utilized more conveniently, it is widely used in various applications.

Generally, the thermal type infrared imaging sensor is operated at about room temperature, and due to the poor heat conductance of air, the heat transmitted from a target heat source to the senor is significantly dissipated, so that an infrared imaging chip thereof has to be tightly packaged in vacuum for increasing sensitivity. For maintaining the normal operation of the infrared imaging sensor, a thermoelectric cooler is often used in the package as a temperature stabilizer.

Since infrared radiation can be absorbed by most materials in the world, a conventional lens material of the infrared thermal imaging system is limited to some materials having lower infrared absorptivity. Accordingly, the conventional infrared lens of the infrared thermal imaging system is very expensive, decreasing the marketability of the infrared thermal imaging system.

In addition, the image of the infrared thermal imaging system is formed by measuring infrared energy radiating from the object. Therefore, the image quality thereof is not as clear and distinguishable as an image taken by a visible light video camera. However, in a dark environment, for example outdoors at night, the infrared thermal imaging system can provide a better image than the visible light video camera.

SUMMARY OF THE INVENTION

It is an object of the present invention to provide an infrared thermal imaging system with a reflective optical module to reduce the manufacture cost thereof.

It is another object of the present invention to provide an infrared thermal imaging system with a visible light video camera disposed at the central axis of the infrared thermal imaging system so as to construct a dual-band reflective infrared thermal imaging system able to take pictures synchronously and coaxially.

To accomplish the above objectives, the present invention provides a dual-band reflective infrared thermal imaging system. The dual-band reflective infrared thermal imaging system includes an infrared thermal imager and a visible light video camera disposed at the central axis of the infrared thermal imager. Accordingly, the dual-band reflective infrared thermal imaging system can coaxially and synchronously take infrared images with the infrared thermal imager and the visible light images with the visible light video camera. The visible light video camera is preferably a refractive visible light video camera.

The infrared thermal imager further includes a reflective optical module, composed of a first reflector and a second reflector, and an infrared imaging sensor for taking the infrared images reflected by the reflective optical module and focused on the infrared imaging sensor. The first reflector and second reflector are preferably coated with an infrared reflective layer, such as a coated aluminum or coated gold layer. At least one of the first and second reflectors is made of a plastic, glass, or aluminum material.

The infrared thermal imager further includes a focusing module, for adjusting the focus of the infrared thermal imager, with a fixing plate to fix the visible light video camera and the second reflector. After the focus of the infrared thermal imager is adjusted, a fixing device, for example a screw, is utilized to fix the fixing plate on the shell of the infrared thermal imager.

The dual-band reflective infrared thermal imaging system further includes a control module, a signal output module, and a power module. The control module and the signal output module can be an integrated control module and an integrated signal output module, or respective control modules and respective signal output modules for the infrared thermal imager and the visible light video camera. The power module includes an internal power module, such as a battery, preferably a rechargeable battery, disposed inside the base of the dual-band reflective infrared thermal imaging system. In addition, the power module preferably includes a power input module electrically coupling to the visible light video camera and the infrared thermal imager.

The dual-band reflective infrared thermal imaging system further includes a dust cover fixed on the shell of the infrared thermal imager to prevent the infrared thermal imager and the visible light video camera from contamination. The dust cover is preferably made of a polyethylene (PE) material and the shell is preferably made of a polyvinyl chloride (PVC) material.

Hence, the reflective optical module can effectively reduce the manufacturing cost of the infrared thermal imager of the dual-band reflective infrared thermal imaging system. In addition, the reflective infrared thermal imager cooperated with the refractive visible light video camera can synchronously and coaxially take images of the object so as to improve the image recognition capacity and broaden the utilization of the infrared thermal imager.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

Figures 1A, 1B, 1C:
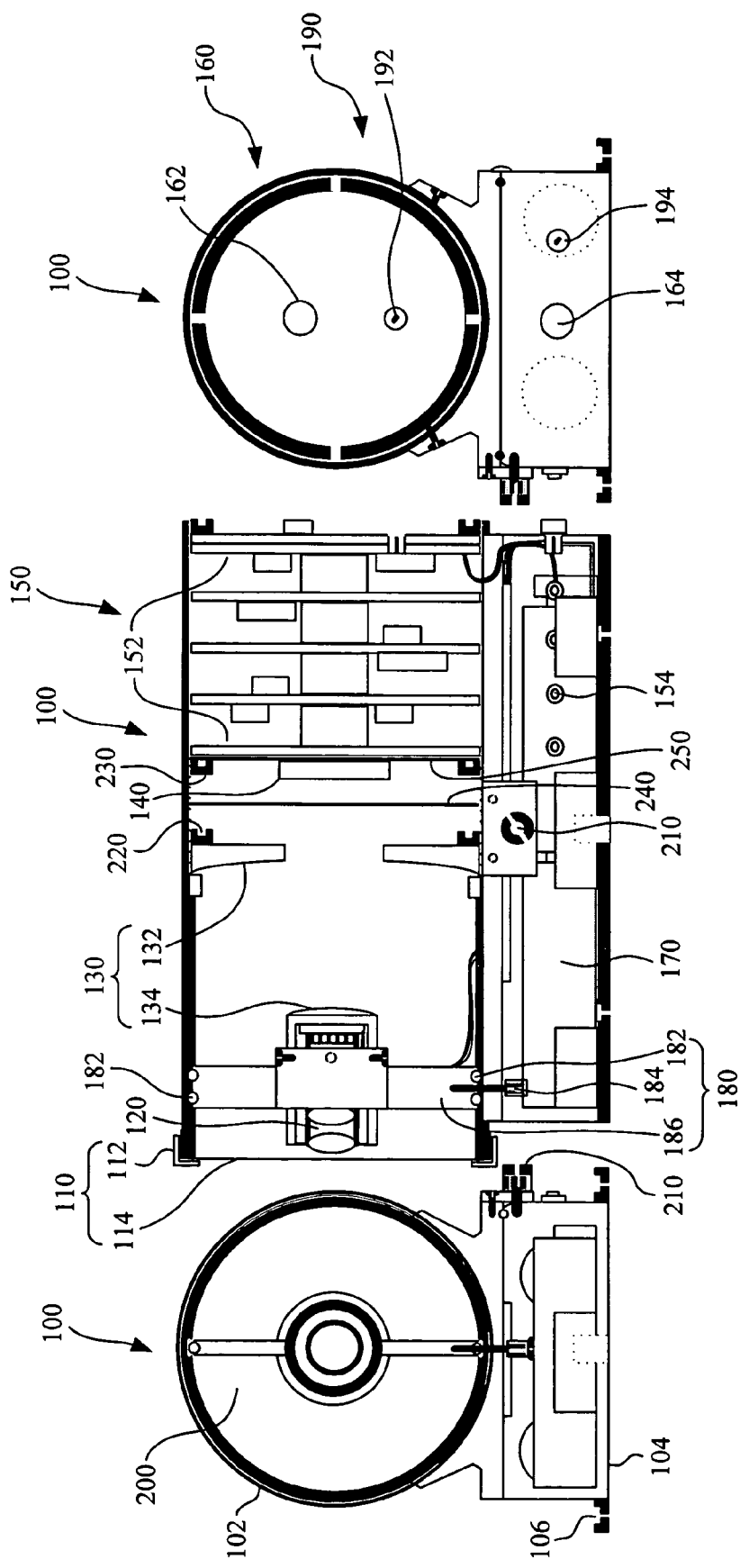
FIG. 1A is a schematic front view of a preferred embodiment of a dual-band reflective infrared thermal imaging system according to the present invention.
FIG. 1B is a schematic side view of the preferred embodiment.
FIG. 1C is a schematic rear view of the preferred embodiment.

The following description is of the best presently contemplated mode of carrying out the present invention. This description is not to be taken in a limiting sense but is made merely for the purpose of describing the general principles of the invention. The scope of the invention should be determined by referencing the appended claims.

FIGS. 1A to 1C illustrate a schematic front view, side view, and rear view of a preferred embodiment of a dual-band reflective infrared thermal imaging system according to the present invention. The dual-band reflective infrared thermal imaging system 100 according to the present invention includes an infrared thermal imager 200 and a visible light video camera 120. The visible light video camera 120 is disposed at a central axis of the infrared thermal imager 200 and is preferably a refractive visible light video camera. Accordingly, the visible light video camera 120 can record images synchronously and coaxially with the infrared thermal imager 200. The visible light video camera 120 can record the images from the central axis of the infrared thermal imager 200 to provide a visible light image for improving the recognition capacity of the infrared images recorded by the infrared thermal imager 200.

The visible light video camera 120 can provide the visible light images to assist the infrared thermal imager 200 that provides the infrared thermal image for clearly and distinguishably monitoring objects when using the dual-band reflective infrared thermal imaging system 100 to, for example, assure the security of the environment. Since the visible light video camera 120 is aligned to the central axis of the infrared thermal imager 200 as well as the central axis of the dual-band reflective infrared thermal imaging system 100, the image signals thereof can be in the same viewing angle. Therefore, the dual-band reflective infrared thermal imaging system 100 can synchronously provide the visible light image and the infrared thermal image in the same angle of view.

The infrared thermal imager 200 further includes a shell 102, a base 104, a fixing flange 106, a dust cover 110, a reflective optical module 130, an infrared imaging sensor 140, a control module 150, a signal output module 160, and a focusing module 180. The visible light video camera 120 is fixed on the focusing module 180 of the infrared thermal imager 200.

The dual-band reflective infrared thermal imaging system 100 according to the present invention utilizes the reflective lens to prevent the infrared image signals from penetrating the body of the lens. The infrared image signals only reflect on the surface of the reflective lens coating, having an infrared reflective layer, for effectively reflecting the infrared image signals. Preferably, the reflective layer is made of an aluminum film coated by a vacuum evaporation or a gold film with high infrared reflective coefficient. With the reflective lens, the infrared image signals can be reflected to the infrared imaging sensor 140. Referring to FIG. 1B, when the infrared image signals enter into the lens of the infrared thermal imager 200, the infrared image signals are first reflected from a first reflector 132 of the reflective optical module 130 to a second reflector 134 of the reflective optical module 130, and subsequently the infrared image signals are reflected to the infrared imaging sensor 140 by precisely setting the focusing module 180.

Accordingly, the infrared thermal imager 200 can fully reflect the infrared image signals and intensity to the infrared imaging sensor 140 by way of the reflective optical module 130. The infrared image signals and intensity do not have to pass through bodies of the first reflector 132 and the second reflector 134, and thus the intensity of the infrared image can be maintained. Hence, the first reflector 132 and the second reflector 134 can be formed of any common material, such as plastic or glass, and coated with an adequate infrared reflective film thereon. Optionally, the first reflector 132 and the second reflector 134 can be directly formed by the aluminum material. Accordingly, the manufacturing cost of the lens module is effectively reduced so as to reduce the total cost of the infrared thermal imager.

The dust cover 110 is preferably composed of a fixing ring 112 and a dust film 114 to efficiently protect the infrared thermal imager 200 and the visible light video camera 120 of the dual-band reflective infrared thermal imaging system 100 from dust and external contamination. Both the visible light image signals and the infrared image signals can pass through the dust film 114, such as a transparent film, which allows the infrared image signal passage, like a polyethylene (PE) film or plate. The PE film and plate are relatively inexpensive thereby reducing the manufacturing cost of the dual-band reflective infrared thermal imaging system 100.

The focusing module 180 is preferably composed of steel balls 182, a fixing device 184, and a fixing plate 186. The visible light video camera 120 is preferably fixed on the fixing plate 186 and aligned with the central axis of the infrared thermal imager 200. When the dual-band reflective infrared thermal imaging system 100 is assembled, the infrared image can be exactly focused on the infrared imaging sensor 140 by adjusting the fixing plate 186 on the shell 102 with the steel ball 182. The fixing plate 186 is subsequently fixed on the shell 102 by the fixing device 184, such as screws, and thereby the infrared thermal imager 200 can capture a clear infrared image.

A control module 150 disposed at the rear of the infrared imaging sensor 140 includes a control circuit 152 for processing the image signals and a control button 154 for operating the dual-band reflective infrared thermal imaging system 100. The images taken by the infrared thermal imager 200 and the visible light video camera 120 are therefore transmitted to desired equipment for monitoring and/or recording by way of the signal output module 160 after being processed by the control circuit 152. In addition, the infrared thermal imager 200 and the visible light video camera 120 can utilize the same control circuit to process the image signals or two independent control circuits to process the infrared image signals and the visible light image signals respectively. The control module 150 can further eliminate distortions of the infrared images and/or the visible light images.

The signal output module 160 preferably includes a first signal output port 162 for outputting the infrared image and a second signal output port 164 for outputting the visible light image. Otherwise, the signal output module 160 can also output a hybrid signal by mixing the infrared image and the visible light image by way of only one output port, and subsequently the desired equipment decodes the hybrid signal to show the infrared image and the visible light image.

For conveniently supplying the power for the dual-band reflective infrared thermal imaging system 100, the dual-band reflective infrared thermal imaging system 100 includes a battery 170 therein, preferably disposed in the base 104. The dual-band reflective infrared thermal imaging system 100 can also utilize an external power input module 190 to supply the desired power. For example, a first power input connector 192 supplies a power for the infrared thermal imager 200, and a second power input connector 194 supplies a power for the visible light video camera 120 and recharges the battery 170. The battery 170 is a standard rechargeable battery, a special rechargeable battery, or a standard commercial primary battery.

The reflective optical module 130 and the control circuit 152 of the dual-band reflective infrared thermal imaging system 100 are preferably fixed on the shell 102 by the fixing ring 220 and the fixing ring 230 respectively. In addition, the base 104 is preferably fixed on the shell 102 by the fixing device 210. The shell 102 is preferably made of a plastic material, such as polyvinyl chloride (PVC) or any other metal or nonmetal material that can absorb the infrared radiation.

The infrared thermal imager 200 of the dual-band reflective infrared thermal imaging system 100 according to the present invention preferably includes a shutter 240 and a radiator 250. The shutter 240 can calibrate and zero the infrared thermal imager 200, and the radiator 250 removes the heat generated by the infrared imaging sensor 140 to the outside of the infrared thermal imager 200 so as to reduce the heat influence on the infrared imaging sensor 140.

Accordingly, the dual-band reflective infrared thermal imaging system according to the present invention can coaxially and synchronously take images with the infrared thermal imager and the visible light camera. The user can clearly and conveniently recognize the appearance of the object with the infrared image cooperated with the visible light image in the same angle of view. Since the angles of view of the infrared image and the visible light image are the same, the image differences therebetween can effectively be reduced. In addition, the dual-band reflective infrared thermal imaging system utilizes the reflective optical module to reflect the infrared images without penetrating through the body of the reflector thereof so as to reduce the cost of the lens and further reduce the manufacturing cost of the dual-band reflective infrared thermal imaging system.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A dual-band reflective infrared thermal imaging system, comprising:
    an infrared thermal imager; and
    a visible light video camera disposed at a central axis of the infrared thermal imager, so that the infrared thermal imager and the visible light video camera take infrared images and visible light images coaxially, wherein the infrared thermal imager further comprises:
    a reflective optical module further comprising a first reflector with a first infrared reflective layer and a second reflector with a second infrared reflective layer;
    an infrared imaging sensor for capturing the infrared images reflected by the reflective optical module and focused on the infrared imaging sensor; and
    a focusing module further comprising:
    a fixing plate for fixing the visible light video camera and the second reflector;
    steel balls coupling the fixing plate to a shell of the infrared thermal imager so that the fixing plate is able to move on the shell; and a fixing device fixing the fixing plate on the shell.

2. The dual-band reflective infrared thermal imaging system of claim 1, further comprising a dust cover fixed on a shell of the infrared thermal imager to prevent the infrared thermal imager and the visible light video camera from contamination.

3. The dual-band reflective infrared thermal imaging system of claim 2, wherein the dust cover is made of a polyethylene (PE) material.

4. The dual-band reflective infrared thermal imaging system of claim 3, wherein the shell is made of a metal material or a polyvinyl chloride (PVC) material.

5. The dual-band reflective infrared thermal imaging system of claim 1, further comprising:
    a control module for processing the infrared images and the visible light images taken by the infrared imaging sensor and the visible light video camera; and
    a signal output module to output the infrared images and the visible light images.

6. The dual-band reflective infrared thermal imaging system of claim 5, wherein the control module further comprises a first control module for processing the infrared images and a second control module for processing the visible light images, wherein the first control module further eliminates distortions of the infrared images; and
    the signal output module further comprises a first signal output module for outputting the infrared images and a second signal output module for outputting the visible light images.

7. The dual-band reflective infrared thermal imaging system of claim 1, wherein the first infrared reflective layer and the second infrared reflective layer are composed of coated metal layers.

8. The dual-band reflective infrared thermal imaging system of claim 1, wherein at least one of the first reflector and the second reflector is made of a glass material.

9. The dual-band reflective infrared thermal imaging system of claim 1, wherein at least one of the first reflector and the second reflector is made of a plastic material.

10. The dual-band reflective infrared thermal imaging system of claim 1, wherein at least one of the first reflector and the second reflector is made of aluminum.

11. The dual-band reflective infrared thermal imaging system of claim 1, further comprising a power module to provide a power for the visible light video camera and the infrared thermal imager.

12. The dual-band reflective infrared thermal imaging system of claim 1, wherein the visible light video camera is a refractive visible light video camera.

* * * * *